United States Patent
Hueda et al.

(10) Patent No.: US 10,110,319 B1
(45) Date of Patent: Oct. 23, 2018

(54) TAP STABILIZER METHOD AND STRUCTURE FOR COHERENT OPTICAL RECEIVER

(71) Applicant: INPHI CORPORATION, Santa Clara, CA (US)

(72) Inventors: Mario R. Hueda, Córdoba (AR); Oscar E. Agazzi, Irvine, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

(21) Appl. No.: 15/792,396

(22) Filed: Oct. 24, 2017

Related U.S. Application Data (60) Provisional application No. 62/412,047, filed on Oct. 24, 2016, provisional application No. 62/412,039, filed on Oct. 24, 2016, provisional application No. 62/412,015, filed on Oct. 24, 2016, provisional application No. 62/412,002, filed on Oct. 24, 2016, provisional application No. 62/412,033, filed on Oct. 24, 2016, provisional application No. 62/412,052,
(Continued)

(51) Int. Cl.
  *H04L 27/26* (2006.01)
  *H04L 25/03* (2006.01)
  *H04L 7/00* (2006.01)
  *H04B 10/61* (2013.01)

(52) U.S. Cl.
  CPC ....... *H04B 10/6161* (2013.01); *H04L 7/0075* (2013.01); *H04L 25/03019* (2013.01); *H04L 27/2634* (2013.01)

(58) Field of Classification Search
  CPC .............. H04B 10/6161; H04L 7/0075; H04L 25/03019; H04L 27/2634

USPC ........................................................ 398/208
See application file for complete search history.

(56) References Cited

U.S. PATENT DOCUMENTS

| 4,669,116 A | 5/1987 | Agazzi et al. |
| 5,870,372 A | 2/1999 | Kuribayashi |

(Continued)

OTHER PUBLICATIONS

Un-Ku Moon et al., "Timing Recovery in CMOS using Nonlinear Spectral-line Method", IEEE 1996 Custom Integrated Circuits Conference, 1996, pp. 13-16, IEEE.
(Continued)

*Primary Examiner* — Dalzid Singh
(74) *Attorney, Agent, or Firm* — Richard T. Ogawa; Ogawa P.C.

(57) ABSTRACT

A method and structure for a coherent optical receiver device. Timing recovery (TR) is implemented after channel dispersion (i.e., chromatic dispersion (CD) and polarization mode dispersion (PMD)) compensation blocks. This architecture provides both improves performance and reduces power consumption of the device. Also, a TR loop is provided, enabling computing, by an error evaluation module, a first sampling phase error (SPE) and computing, by a timing phase information (TPI) module coupled to the error evaluation module, a second SPE from a plurality of CD equalizer taps PMD equalizer taps. The first and second SPE are combined into a total phase error (TPE) in a combining module, and the resulting TPE is filtered by a timing recovery (TR) filter coupled to an interpolated timing recovery (ITR) module and the combining module. The ITR module then synchronizes an input signal of the coherent optical receiver according to the TPE.

31 Claims, 6 Drawing Sheets

Related U.S. Application Data filed on Oct. 24, 2016, provisional application No. 62/412,071, filed on Oct. 24, 2016.

(56) References Cited

U.S. PATENT DOCUMENTS

| | | | |
|---|---|---|---|
| 7,693,214 | B2 | 4/2010 | Shida |
| 7,894,728 | B1 | 2/2011 | Sun et al. |
| 8,244,142 | B2 | 8/2012 | Wagner et al. |
| 8,565,621 | B2 | 10/2013 | Ibragimov et al. |
| 8,634,726 | B2 | 1/2014 | Zhang et al. |
| 8,655,191 | B2 | 2/2014 | Kaneda et al. |
| 8,687,974 | B2 | 4/2014 | Zelensky et al. |
| 8,712,247 | B2 | 4/2014 | Hauske |
| 8,731,413 | B1 | 5/2014 | Dave et al. |
| 8,873,358 | B2 | 10/2014 | Saito et al. |
| 2006/0013590 | A1 | 1/2006 | Hueda et al. |
| 2007/0206963 | A1 | 9/2007 | Koc |
| 2008/0175590 | A1 | 7/2008 | Perkins et al. |
| 2009/0148164 | A1* | 6/2009 | Roberts ............ H04B 10/677 398/65 |
| 2009/0252497 | A1 | 10/2009 | Younce et al. |
| 2010/0329677 | A1 | 12/2010 | Kaneda et al. |
| 2011/0064421 | A1 | 3/2011 | Zhang et al. |
| 2011/0150506 | A1 | 6/2011 | Tanimura et al. |
| 2011/0229127 | A1 | 9/2011 | Sakamoto et al. |
| 2011/0268459 | A1* | 11/2011 | Rollins ............ H04B 10/299 398/208 |
| 2012/0096061 | A1 | 4/2012 | Hauske |
| 2012/0177156 | A1 | 7/2012 | Hauske et al. |
| 2012/0213510 | A1 | 8/2012 | Stojanovic |
| 2012/0219302 | A1 | 8/2012 | Sun et al. |
| 2012/0257652 | A1 | 10/2012 | Malipatil et al. |
| 2012/0269513 | A1 | 10/2012 | Abe |
| 2012/0288275 | A1 | 11/2012 | Zhang et al. |
| 2013/0039665 | A1 | 2/2013 | Hauske |
| 2013/0084080 | A1 | 4/2013 | Shibutani |
| 2013/0209089 | A1 | 8/2013 | Harley et al. |
| 2013/0230311 | A1* | 9/2013 | Bai ............... H04B 10/2581 398/9 |
| 2013/0243127 | A1 | 9/2013 | Chmelar et al. |
| 2013/0251082 | A1 | 9/2013 | Abe |
| 2013/0259490 | A1 | 10/2013 | Malouin et al. |
| 2013/0336647 | A1 | 12/2013 | Le Taillandier De Gabory et al. |
| 2013/0343490 | A1 | 12/2013 | Wertz et al. |
| 2014/0161470 | A1 | 6/2014 | Zelensky et al. |
| 2014/0254644 | A1 | 9/2014 | Gotman et al. |
| 2016/0182182 | A1* | 6/2016 | Schmogrow ............ H04J 14/06 398/65 |

OTHER PUBLICATIONS

Oscar E. Agazzi et al., "Maximum-Likelihood Sequence Estimation in Dispersive Optical Channels", Journal of Lightwave Technology, Feb. 2005, pp. 749-763, vol. 23, No. 2, IEEE.

Oscar Agazzi et al., "Timing Recovery in Digital Subscriber Loops," IEEE Transactions on Communications, Jun. 1985, p. 558-569, vol. COM-33, No.6, IEEE.

Diego E. Crivelli et al., "Adaptive Digital Equalization in the Presence of Chromatic Dispersion, PMD, and Phase Noise in Coherent Fiber Optic Systems", IEEE 2004 Global Telecommunications Conference, Nov. 29-Dec. 3, 2004, p. 2545-2551, vol. 4, IEEE.

M. Kuschnerov et al., "DSP for Coherent Single-Carrier Receivers", Journal of Lightwave Technology, Aug. 15, 2009, p. 3614-3622, vol. 27, No. 16, IEEE.

David G. Messerschmitt, "Frequency Detectors for PLL Acquisition in Timing and Carrier Recovery", IEEE Transactions on Communications, Sep. 1979, p. 1288-1295, vol. COM-27, No. 9, IEEE.

Timo Pfau et al., "Hardware-Efficient Coherent Digital Receiver Concept with Feedforward Carrier Recovery for M-QAM Constellations", Journal of Lightwave Technology, Apr. 15, 2009, pp. 989-999, vol. 27, No. 8, IEEE.

Xiaofu Wu et al., "Iterative Carrier Recovery in Turbo Receivers with Distributed Pilots", IEEE International Conference on Consumer Electronics, Communications and Neteworks (CECNet), Apr. 2011, pp. 5024-5026, IEEE.

H. Zhang et al., "Cycle Slip Mitigation in POLMUX-QPSK Modulation", Optical Fiber Communication Conference and Exposition (OFC/NFOEC), 2011 and the National Fiber Optic Engineers Conference, Mar. 2011, pp. 1-3, Optical Society of America.

Shaoliang Zhang et al., "Pilot-Assisted Decision-Aided Maximum-Likelihood Phase Estimation in Coherent Optical Phase-Modulated Systems with Nonlinear Phase Noise", IEEE Photonics Technology Letters, Mar. 15, 2010, pp. 380-382, vol. 22, No. 6, IEEE.

Manar El-Chammas et al., "A 12-GS/s 81-mW 5-bit Time-Interleaved Flash ADC With Background Timing Skew Calibration", IEEE Journal Solid-State Circuits, Apr. 2011, pp. 838-847, vol. 46, No. 4, IEEE.

J. C. Geyer et al., "Optical Performance Monitoring using a 43Gb/s Realtime Coherent Receiver (Invited)", 2009, pp. 93-94, IEEE.

J.C. Geyer et al., "Performance Monitoring Using Coherent Receivers", 2009, pp. 1-3, IEEE.

Yuriy M Greshishchev et al., "A 40GS/s 6b ADC in 65nm CMOS", IEEE International Solid-State Circuits Conference, Feb. 10, 2010, pp. 390-392, IEEE.

Fabian N. Hauske et al., "Optical Performance Monitoring in Digital Coherent Receivers", Journal of Lightwave Technology, Aug. 15, 2009, pp. 3623-3631, vol. 27, No. 16, IEEE.

Andreas Leven et al., "Real-Time Implementation of Digital Signal Processing for Coherent Optical Digital Communication Systems", IEEE Journal of Selected Topics in Quantum Electronics, Sep./Oct. 2010, pp. 1227-1234, vol. 16, No. 5, IEEE.

L. E. Nelson et al., "Performance of 46-Gbps Dual-Polarization QPSK Transceiver With Real-Time Coherent Equalization Over High PMD Fiber", Journal of Lightwave Technology, Feb. 1, 2009, p. 158-167, vol. 27, No. 3, IEEE.

Andrew J. Viterbi et al., "Nonlinear Estimation of PSK-Modulated Carrier Phase with Application to Burst Digital Transmission", IEEE Transactions on Information Theory, Jul. 1983, pp. 543-551, vol. 29, No. 4, IEEE.

* cited by examiner

TAP STABILIZER METHOD AND STRUCTURE FOR COHERENT OPTICAL RECEIVER

CROSS-REFERENCES TO RELATED APPLICATIONS

The present application claims priority to an incorporates by reference, for all purposes, the following U.S. provisional patent applications: U.S. Provisional App. No. 62/412,052, filed on Oct. 24, 2016; U.S. Provisional App. No. 62/412,071, filed on Oct. 24, 2016; U.S. Provisional App. No. 62/412,033, filed on Oct. 24, 2016; U.S. Provisional App. No. 62/412,047, filed on Oct. 24, 2016; U.S. Provisional App. No. 62/412,015, filed on Oct. 24, 2016; U.S. Provisional App. No. 62/412,002, filed on Oct. 24, 2016; and U.S. Provisional App. No. 62/412,039, filed on Oct. 24, 2016. The present application also incorporates by reference, for all purposes, the following U.S. Patents: U.S. Pat. No. 9,337,934, filed on Nov. 29, 2013, and issued on May 10, 2016; U.S. Pat. No. 9,178,625, filed on Dec. 3, 2013, and issued on Nov. 3, 2015; and U.S. Pat. No. 9,077,572, filed on Jan. 17, 2013, and issued on Jul. 7, 2015.

BACKGROUND OF THE INVENTION

The present invention relates to communication systems and integrated circuit (IC) devices. More particularly, the present invention provides for improved methods and devices for optical communication.

Over the last few decades, the use of communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

Optical communication is one major technological area that is growing to address these high demands on data. Optical communication systems typically communicate data over a plurality of channels corresponding to different phases and/or polarizations of the optical signal. While the data communicated over the different channels is typically aligned relative to a common clock when transmitted by the transmitter, delay (or skew) may be introduced into one or more of the channels based on characteristics of the transmitter, receiver, and/or the optical fiber. As a result, the relative timing of the data in the various channels may be misaligned at the receiver, causing degradation of the recovered data.

Although there are several types of devices and methods related to optical communication systems, they have been inadequate for the advancement of various applications. Conventional embodiments consume large areas or large amounts of power and suffer from performance limitations. Therefore, improved devices and methods for optical communication systems and related electronics are highly desired.

BRIEF SUMMARY OF THE INVENTION

The present invention relates to communication systems and integrated circuit (IC) devices. More particularly, the present invention provides for improved methods and devices for optical communication.

The present invention provides for the TR operation after channel dispersion compensation blocks (e.g., for chromatic dispersion (CD) and polarization mode dispersion (PMD)). This architecture provides both improves performance and reduces power consumption of the receiver device. Performance is improved because channel impairments (e.g., high order PMD, residual CD, very low excess bandwidth, etc.) do not impact the TR operation. The latency of the TR loop is not affected since the feed-forward equalization (FFE) equalizer is not included within the TR loop. Power consumption is reduced because the use of the FFE immediately after the bulk chromatic dispersion (BCD) equalizer, which enables residual CD and PMD to be jointly compensated in only one frequency-domain (FD) equalizer. Using a frequency domain block least-means-square (LMS) adaptation reduces the complexity of the device architecture. Further, baud rate timing recovery algorithms, such as Muller and Mueller (M&M) can be adopted. Thus, in an example, the present invention adopts an asynchronous FD adaptive equalizer to implement timing recovery with equalized signals, and to reduce implementation complexity.

In various examples, the present invention provides for a method and structure for a coherent optical receiver device. The device can include an input signal; a first fast Fourier transform (FFT) module receiving the input signal, the first FFT module being configured to compute a first discrete Fourier transform (DFT) of the input signal; a chromatic dispersion (CD) equalizer module coupled to the first FFT module, the CD equalizer module being configured to compensate for CD affecting the input signal; a polarization mode dispersion (PMD) equalizer module coupled to the CD equalizer and a least means square (LMS) module, the PMD equalizer module being configured to compensate for PMD affecting the input signal following compensation by the CD equalizer module. The PMD equalizer module includes a plurality of PMD taps. In a specific example, the CD equalizer module includes a non-adaptive frequency-domain (FD) equalizer, and the PMD equalizer module includes an adaptive FD equalizer. Further, the input can be a dual polarization input with an x-type and y-type inputs.

In an example, the device can also include an inverse FFT (IFFT) module coupled to the PMD equalizer module, the IFFT module being configured to compute an inverse DFT of the input signal; an interpolated timing recovery (ITR), slicer, and error evaluation module coupled to the IFFT module. The ITR, slicer, and the error evaluation can be separate modules, the ITR module being configured to retime the input signal, the slicer module being configured to derive the data stream, and the error evaluation module being configured to retime the input signal.

In an example, the device can include a zero padding module coupled to the slicer and error evaluation module, the zero padding module being configured to increase a sampling rate of the input signal; and a second FFT module coupled to the zero padding module, the second FFT module being configured to compute a second DFT of the input signal. In an example, the LMS module is coupled to the second FFT module, the CD equalizer module, and the PMD equalizer module. The LMS module outputs to the PMD equalizer module and is configured to filter the input signal.

In an example, the PMD equalizer is coupled to an ITR module. In a specific example, the IFFT module is configured between the PMD equalizer module and the ITR module. An error evaluation or error computation module is coupled to the ITR module. The error evaluation module can be configured to compute a first sampling phase error (SPE). The device also includes a timing phase information (TPI) module, a combining module, and a timing recovery (TR) filter. The TPI module can be coupled to the PMD equalizer module or to an IFFT module that is coupled to the PMD equalizer module (as described for the ITR module). The TPI module can be configured to compute a second SPE from the plurality of PMD taps from the PMD equalizer module. Then, the combining module can combine the first SPE and the second SPE into a total phase error (TPE). The TR filter can filter the TPE to be used by the ITR module to synchronize the input signal.

The method includes computing, by the error evaluation module, a first sampling phase error (SPE) and computing, by a timing phase information (TPI) module, a second SPE from a plurality of chromatic dispersion (CD) equalizer taps and polarization mode (PMD) equalizer taps. The first and second SPE are combined into a total phase error (TPE) in a combining module, and the resulting TPE is filtered by the TR filter coupled to an ITR module and the combining module. The ITR module then synchronizes an input signal of the coherent optical receiver according to the TPE. Those of ordinary skill in the art will recognize other variations, modifications, and alternatives.

A further understanding of the nature and advantages of the invention may be realized by reference to the latter portions of the specification and attached drawings.

BRIEF DESCRIPTION OF THE DRAWINGS

In order to more fully understand the present invention, reference is made to the accompanying drawings. Understanding that these drawings are not to be considered limitations in the scope of the invention the presently described embodiments and the presently understood best mode of the invention are described with additional detail through the use of the accompanying drawings in which.

DETAILED DESCRIPTION OF THE INVENTION

The present invention relates to communication systems and integrated circuit (IC) devices. More particularly, the present invention provides for improved methods and devices for optical communication.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Clock timing recovery (TR) critical for data communications, and optical data communications are no exception. Certain conventional devices implement timing recovery operations with intersymbol interference (ISI)-free samples. However, there is an interaction problem between timing synchronization and equalization in coherent optical applications. A high higher of multiplications and oversampling is required by squared or fourth-power based TR algorithms, which leads to increased power consumption. Examples of the present invention address this problem with a receiver architecture based on asynchronous frequency domain equalization.

In an example, the present invention provides for the TR operation after channel dispersion compensation blocks (e.g., for chromatic dispersion (CD) and polarization mode dispersion (PMD)). This architecture provides both improves performance and reduces power consumption of the receiver device. Performance is improved because channel impairments (e.g., high order PMD, residual CD, very low excess bandwidth, etc.) do not impact the TR operation. The latency of the TR loop is not affected since the feed-forward equalization (FFE) equalizer is not included within the TR loop. Power consumption is reduced because the use of the FFE immediately after the bulk chromatic dispersion (BCD) equalizer, which enables residual CD and PMD to be jointly compensated in only one frequency-domain (FD) equalizer. Using a frequency domain block least-means-square (LMS) adaptation reduces the complexity of the device architecture. Further, baud rate timing recovery algorithms, such as Muller and Mueller (M&M) can be adopted. Thus, in an example, the present invention adopts an asynchronous FD adaptive equalizer to implement timing recovery with equalized signals, and to reduce implementation complexity.

Figure 1:
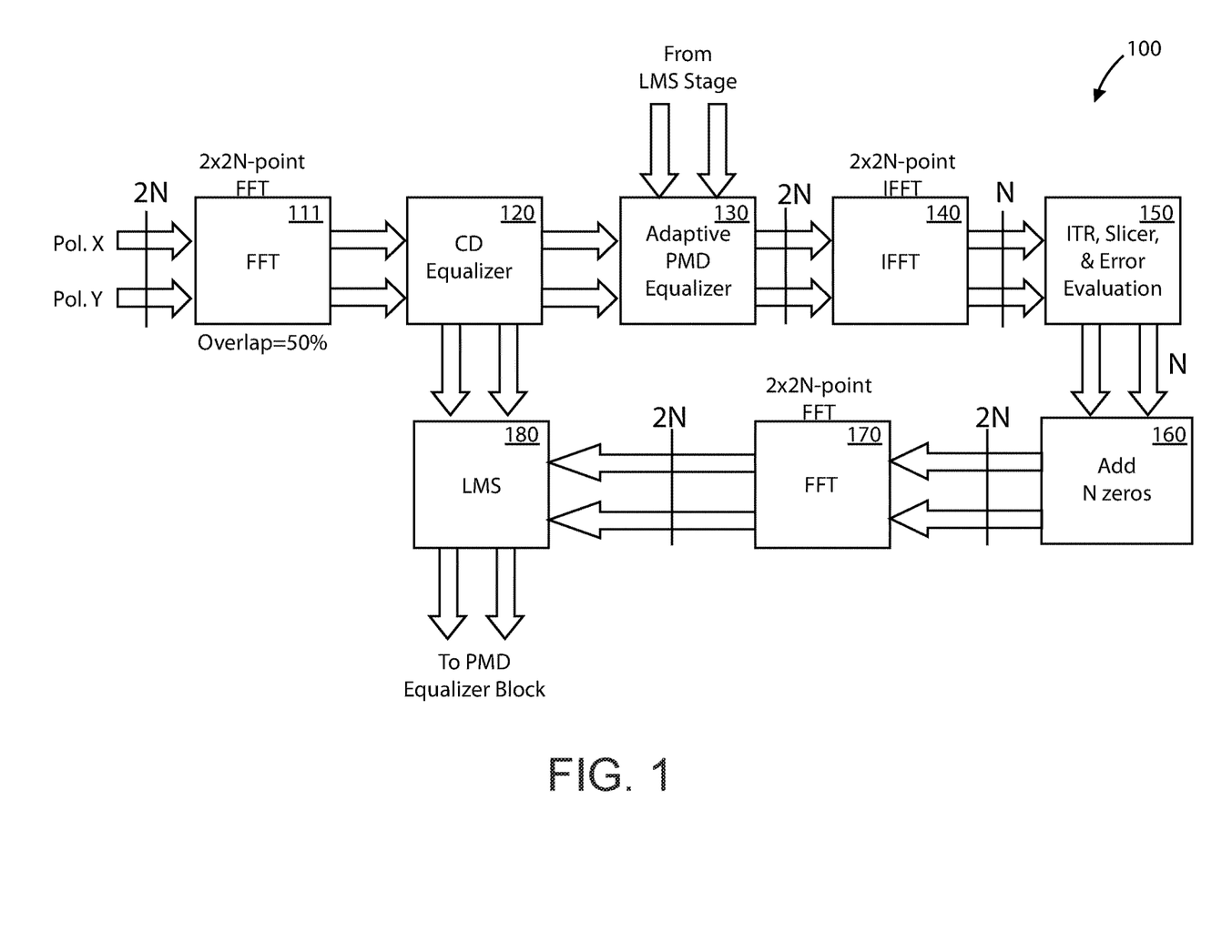
FIG. 1 is a simplified diagram illustrating a block diagram of a coherent optical receiver according to an example of the present invention.

FIG. 1 is a simplified diagram illustrating a block diagram of a coherent optical receiver according to an example of the present invention. As shown, device 100 can include an input signal; a first fast Fourier transform (FFT) module receiving the input signal, the first FFT module 111 being configured to compute a first discrete Fourier transform (DFT) of the input signal; a chromatic dispersion (CD) equalizer module 120 coupled to the first FFT module 111, the CD equalizer module 120 being configured to compensate for CD affecting the input signal; a polarization mode dispersion (PMD) equalizer module 130 coupled to the CD equalizer and a least means square (LMS) module 180, the PMD equalizer module 130 being configured to compensate for PMD affecting the input signal following compensation by the CD equalizer module. The PMD equalizer module 130 includes a plurality of PMD taps. In a specific example, the CD equalizer module includes a non-adaptive frequency-domain (FD) equalizer, and the PMD equalizer module includes an adaptive FD equalizer. Further, the input can be a dual polarization input with an x-type and y-type inputs.

In an example, the device can also include an inverse FFT (IFFT) module 140 coupled to the PMD equalizer module 130, the IFFT module being configured to compute an inverse DFT of the input signal; an interpolated timing recovery (ITR), slicer, and error evaluation module 150 coupled to the IFFT module 140. The ITR, slicer, and the error evaluation can be separate modules, the ITR module being configured to retime the input signal, the slicer module being configured to derive the data stream, and the error evaluation module being configured to retime the input signal. Further details are provided in reference to FIG. 2.

In an example, the device can include a zero padding module 160 coupled to the slicer and error evaluation module 150, the zero padding module 160 being configured to increase a sampling rate of the input signal; and a second FFT module 170 coupled to the zero padding module 160, the second FFT module 170 being configured to compute a second DFT of the input signal. In an example, the LMS module 180 is coupled to the second FFT module 170, the CD equalizer module 120, and the PMD equalizer module 130. The LMS module 180 outputs to the PMD equalizer module 130 and is configured to filter the input signal. Those of ordinary skill in the art will recognize other variations, modifications, and alternatives.

The reduction of complexity results from not having to use separate FD BCD and FFE equalizers. As shown in FIG. 1, only one (dual polarization) FFT and only one (dual polarization) IFFT are required in the signal path. An architecture using separate FD blocks for the BCD and FFE requires extra FFTs and IFFTs as a result of going back and forth from the frequency domain to the time domain. Further, the LMD update can be viewed as computing a correlation between the input signal and the error. Here, this correlation is computed in the frequency domain, which reduces complexity the same way as in convolution computations.

With this architecture, an interaction problem arises when TR is achieved after the adaptive equalizer (i.e., PMD equalizer). This problem occurs because the adaptation algorithm of the equalizer and the timing-synchronizer use the same (equalized) signal as their input. The equalizer tries to compensate the misadjustment of the discrete time impulse response due to the sampling phase error, while the TR tries to equalize the distortion of the impulse response by changing the sampling phase. As a consequence, the timing phase and the equalizer taps are drifting. Conventional solutions to this problem have severe drawbacks in (time variant) coherent optical channels. Making the timing loop much faster than the equalizer can mitigate this interaction problem, but the timing phase may still drift slowly over long periods of time.

According to an example of the present invention, a constrained adaptive algorithm can be used to reduce or eliminate strong interaction between the adaptive equalizer and the timing recovery loop. Constraining multiple equalizer taps can be done if the adaptive filter is known to have a certain characteristic (e.g., linear phase implies tap symmetry). A constrained adaptive algorithm can also be applied in which the magnitude and the phase responses of the adaptive equalizer remain unchanged at a given frequency. Timing phase information (TPI) contained within the equalizer taps can also be fed into the timing recovery loop as a factor for computing sampling phase error.

Figure 2:
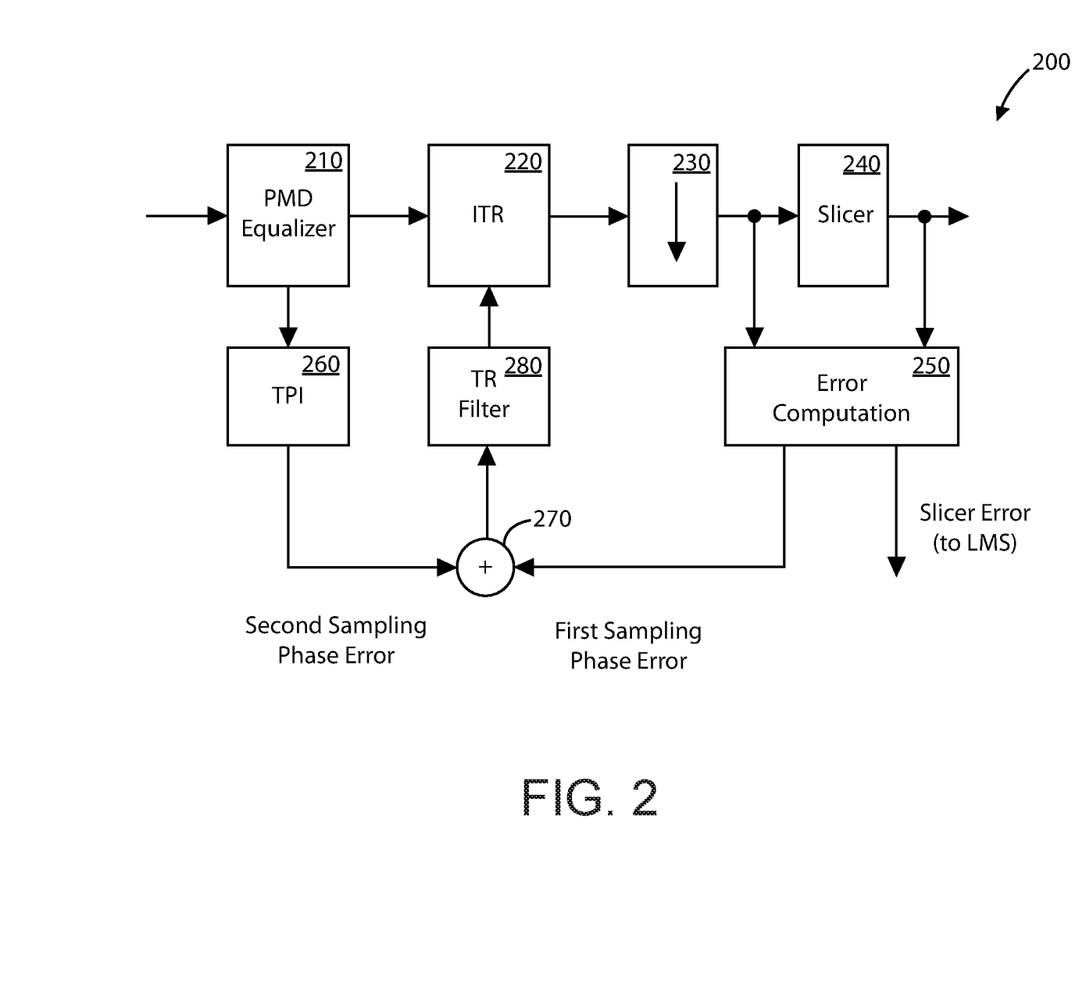
FIG. 2 is a simplified diagram illustrating a block diagram of a portion of a coherent optical receiver according to an example of the present invention.

FIG. 2 is a simplified diagram illustrating a block diagram of a portion of a coherent optical receiver according to an example of the present invention. As shown, device 200 includes a PMD equalizer module 210, which is similar to the PMD equalizer module 130 of FIG. 1. This PMD equalizer is coupled to an ITR module 220. In a specific example, an IFFT module (such as IFFT module 140 of FIG. 1) is configured between the PMD equalizer module 210 and the ITR module 220. The ITR module is configured to synchronize the input signal according to a tap stabilizing algorithm.

Let c be the impulse response of the equalizer and $\tau_n$ be the timing error. Assuming that the timing error is small, the equalizer impulse response in the presence of timing error can be expressed as a linear function of the timing error $\tau_n$ as follows:

$$c(E(\tau_n)) = s_c E(\tau_n) + c_{\tau=0}$$

where $s_c$ is the vector of the slope of the equalizer coefficients and $E(\tau_n)$ comes from the averaging of the equalizer loop.

Since the TR loop is achieved after the adaptive equalizer, its timing function will be modified as a result of the variation of the equalizer coefficients. If $c_{\tau=0}$ is available, it is possible to extract the mean timing error by adding a new timing-error signal obtained from the equalizer taps as follows:

$$s_c E(\tau_n) = c(E(\tau_n)) - c_{\tau=0}$$

This approach requires a priori knowledge of the particular equalizer coefficients at an optical timing phase ($c_{\tau=0}$).

In an example, the present tap stabilizer algorithm can be used to obtain sampling phase information based on the response of an multiple input multiple output (MIMO) FFE. The algorithm can use the Jones matrix because it is unitary, its determinant is independent of the fiber impairments (i.e., DGD, second order PMD (SOPMD)), and contains information of the timing error. This scheme is able to provide reliable information even in the presence of highly dispersive channels. Furthermore, this scheme is able to work with any roll-off factor and can be applied to blind adaptation procedures.

The channel transfer matrix at the FFE input can be written as follows:

$$H(\omega) = G(\omega) J(\omega)$$

where the scalar linear factor $G(\omega)$ represents the total response of the transmit pulse, residual CD, and receive pulse, while $J(\omega)$ is the PMD Jones unitary matrix (i.e., $\det\{J(\omega)\}=1$) given by the following:

$$J(\omega) = \begin{bmatrix} U(\omega) & V(\omega) \\ -V^*(\omega) & U^*(\omega) \end{bmatrix}$$

The determinant of the channel transfer matrix is as follows:

$$\det\{H(\omega)\}=G^2(\omega)\det\{J(\omega)\}=G^2(\omega)$$

Here, the determinant is not affected by the PMD.

Let $F(\omega)$ be the transfer matrix of the FSE given by the following:

$$F(\omega) = \begin{bmatrix} F_{11}(\omega) & F_{12}(\omega) \\ F_{21}(\omega) & F_{22}(\omega) \end{bmatrix}$$

From the above, $F(\omega)$ can be rewritten as follows:

$$F(\omega)=P(\omega)J^H(\omega)$$

where $P(\omega)$ is a scalar linear factor that depends on $G(\omega)$ (and possibly the noise power for minimum mean-square error (MMSE) criteria), while the superscript "H" denotes transpose and conjugate.

The determinant of the equalizer transfer matrix is as follows:

$$\det\{F(\omega)\}=P^2(\omega)\det\{J^H(\omega)\}=P^2(\omega)$$

Here, the determinant is not affected by the PMD. That is, the determinant is independent of PMD variation such as polarization rotation.

Let $J(\omega_0, t)$ and $F(\omega_0, t)=P(\omega_0)J^H(\omega_0, t)$ be the PMD matrix and the FSE transfer matrix at a given frequency $\omega_0$ and instant t, respectively. For simplicity, the CD parameter is assumed to not change with time (i.e., $P(\omega_0, t)=P(\omega_0)$). The determinant can be defined as follows:

$$S(\omega_0,t)=\det\{F(\omega_0,t)\}=P^2(\omega_0)$$

Here, $S(\omega_0, t)$ is independent of PMD time variations.

Let $F(\omega_0, 0)$ be the transfer matrix at instant t=0. In the presence of a clock offset $\Delta T$, the transfer matrix at instant t is as follows:

$$F(\omega_0,t)=e^{-j\omega_0\tau}P(\omega_0)J^H(\omega_0,t)$$

where $\tau=\Delta T/(T+\Delta\tau)t<200\times10^{-6}t$, with T being the symbol period. From the above, $S(\omega_0, t)$ is as follows:

$$S(\omega_0,t)=e^{-j2\omega_0\tau}S(\omega_0,0)$$

from which the determinant contains information of the sampling phase error.

Denoting $|S(\omega_0, t)|=K$ and taking into account the following:

$$S(\omega_0,t)=e^{-j2\omega_0\tau}S(\omega_0,0)$$

Note that $\rho(\omega_0, t)$ is as follow:

$$\rho(\omega_0,t)=S(\omega_0,t)S^*(\omega_0,0)=K^2e^{-j2\omega_0\tau}$$

Then, the phase error signal can be obtained from the following:

$$\varepsilon_{fse}=-\text{angle}(\rho(\omega_0,t))=2\omega_0\tau$$

The sampling phase error is derived directly from the FFE taps, therefore it can be used even during a blind adaptation procedure. The phase error as defined previously can be used directly for timing recovery. Further note that P+I TR loop will avoid any FFE tap shifting (i.e., T→0).

In practical receivers, independent carrier recovery for each polarization can be used at the output of the FFE. In this case, the FFE taps for each polarization can be slowly rotated with arbitrary phases, as shown by the following:

$$F(\omega_0,t)=e^{-j\omega_0\tau}e^{j\phi(t)}P(\omega_0)R(t)J^H(\omega_0,t)$$

with the following:

$$R(t) = \begin{Bmatrix} e^{\frac{\phi_x(t)-\phi_y(t)}{2}} & 0 \\ 0 & e^{\frac{-j(\phi_x(t)-\phi_y(t))}{2}} \end{Bmatrix}$$

$$\phi(t) = \frac{\phi_x(t)+\phi_y(t)}{2}$$

Here, R(t) is unitary and the phase of the determinant of $F(\omega_0, 0)$ varies with the rotations of the FFE taps, shown by the following:

$$S(\omega_0,t)=e^{j2\omega_0\tau}e^{j2\phi(t)}S(\omega_0,0)$$

Thus, the rotations of the equalizer taps impact the phase of the determinant of $F(\omega_0, 0)$; therefore, it cannot be used to provide reliable information of the sampling phase. However, in order to mitigate the impact of the taps rotation on the sampling phase estimation, $S(\omega_0, t)$ is defined as the determinant of the following matrix:

$$M_f(\omega_0,t)=F(\omega_0,t)F^H(-\omega_0,t)$$

$$=e^{-j2\omega_0\tau}|P(\omega_0)|^2R(t)J^H(-\omega_0,t)R^H(t)$$

$$=e^{-j2\omega_0\tau}|P(\omega_0)|^2Z(\omega_0,-\omega_0,t)$$

where $Z(\omega_0, -\omega_0, t)$ is a unitary matrix for all $(\omega_0, t)$.

Thus, the taps rotation does not affect the phase of the determinant, which is shown as follows:

$$S(\omega_0,t)=\det\{M_f(\omega_0,t)\}=e^{-j4\omega_0\tau}|P(\omega_0)|^4$$

Let $F(\Omega_0)$ be the transfer matrix of the discrete time FSE given by the following:

$$F(\Omega_0) = \begin{bmatrix} F_{11}(\Omega_0) & F_{12}(\Omega_0) \\ F_{21}(\Omega_0) & F_{22}(\Omega_0) \end{bmatrix}$$

where $\Omega_0$ is as follows:

$$\Omega_0 = \omega_0\frac{T}{OS}$$

where OS is an oversampling factor.

Elements of $F(\Omega_0)$ can be evaluated as follows:

$$F_{ab}(\Omega_0) = \sum_{k=0}^{N_{FSE}-1} f_{ab}(k)e^{-jk\Omega_0}$$

where $f_{ab}(k)$, $a, b \in [1,2]$ are the taps of the FSE and $N_{FSE}$ is the number of taps.

If $\Omega_0$ is set as follows:

$$\Omega_0 = \pm \frac{\pi}{4}$$

then the filtering process is simplified for VLSI implementation.

Returning to the device architecture 200, an error evaluation or error computation module 250 is coupled to the ITR module 220. The error evaluation module can be configured to compute a slicer error and a first sampling phase error (SPE). The slicer error can be outputted to an LMS module, similar to LMS module 180 of FIG. 1. In order to provide a proper bandwidth for the TR loop, the sampling phase information derived from the FSE taps can be combined with a baud rate synchronization technique, such as one based on the Muller and Mueller (M&M) phase error. In a specific example, the first SPE is calculated according to a baud rate synchronization technique based on a M&M phase error, which can be represented by the following equation:

$$\varepsilon_{mm} = K_{mm} \Re \left( \sum_{nN_p+2}^{(n+1)N_p} \hat{a}^*(k)q(k-1) - \hat{a}^*(k-1)q(k) \right)$$

where $K_{mm}$ is a certain gain,
where $\Re$ refers to real component of a complex number,
where $N_p$ is a parallelism factor,
where $q(k)$ is an input of slicer and error evaluation module, and
where $\hat{a}^*$ is an output of the slicer and error evaluation module.

In an example, a compression module 230 can be coupled between the ITR module 220 and the error computation module 250. The compression module 230 can be configured to compress the dual polarization input signal. Further, a slicer module 240 can be coupled to both the compression module 230 and the error computation module 250. The slicer module 240 can be configured to derive a data stream from the input signal. Those of ordinary skill in the art will recognize other variations, modifications, and alternatives.

In an example, the device 200 also includes a timing phase information (TPI) module 260, a combining module 270, and a timing recovery (TR) filter 280. The TPI module 260 can be coupled to the PMD equalizer module 210 or to an IFFT module that is coupled to the PMD equalizer module 210 (as described for the ITR module 220). The TPI module 260 can be configured to compute a second SPE from the plurality of PMD taps from the PMD equalizer module 210. Then, the combining module 270 can combine the first SPE and the second SPE into a total phase error (TPE). That is, the total phase error is $\varepsilon_t = \varepsilon_{mm} + \varepsilon_{fse}$. The TR filter 280 can filter the TPE to be used by the ITR module 220 to synchronize the input signal.

The present invention provides for device structures and methods of computing sampling phase error according to the algorithms described previously. In a specific example, the TPI module computes the second SPE according to the following equation:

$$\Sigma_{fse} = -K_{fse} \text{angle}(\det(M_f))$$

where $K_{fse} = [2^{-1}, \ldots, 2^{-4}]$, and
where $M_f = e^{-j2\omega_0 \tau} |P(\omega_0)|^2 Z(\omega_0, -\omega_0, t)$,
where $\omega_0$ is a given frequency, where $$\tau = \frac{\Delta T}{(T + \Delta T)t} < 200 \times 10^{-6} t,$$

where $P(\omega_0)$ is a CD parameter, and
where $Z(\omega_0, -\omega_0, t)$ is a unitary matrix for all $(\omega_0, t)$.

In a specific example, the TPI module computes the second SPE according to the following equation:

$$\varepsilon_{fse} = -2\omega_0 \tau$$

where $\omega_0$ is a given frequency, and
where $$\tau = \frac{\Delta T}{(T + \Delta T)t} < 200 \times 10^{-6} t,$$

where t is a given time, and
where T is a symbol period.

In an example, the present invention provides a method of operating a coherent optical receiver device. The method can include providing an input signal; computing, by a first fast Fourier transform (FFT) module receiving the input signal, a first discrete Fourier transform (DFT) of the input signal. The method can include compensating, by a chromatic dispersion (CD) equalizer module coupled to the first FFT module, for CD affecting the input signal; and compensating, by a polarization mode dispersion (PMD) equalizer module coupled to the CD equalizer module and coupled to a least means square (LMS) module and having a plurality of PMD taps, for PMD affecting the input signal following the compensation by the CD equalizer module. Further, the method can include computing, by an inverse FFT (IFFT) module coupled to the PMD equalizer module, an inverse DFT of the input signal. In an example, the method includes filtering, by the LMS module coupled to the CD equalizer module and the second FFT module and the PMD equalizer module, the input signal.

In an example, the method includes computing a total sampling error from two sampling phase errors. More specifically, the method can include computing, by an error evaluation module coupled to the IFFT module, a first sampling phase error (SPE); and computing, by a timing phase information (TPI) module coupled to the error evaluation module and the IFFT module, a second SPE from the plurality of PMD taps. Then, the method includes combining, by a combining module coupled to the TPI module and the error evaluation module, the first and second SPE into a total phase error (TPE). Further, the method includes filtering, by a timing recovery (TR) filter coupled to an interpolated timing recovery (ITR) module and the combining module, the TPE. With the filtered TPE, the method includes synchronizing, by the ITR module, the input signal according to the TPE. Outside of the TR loop, the method includes computing, by a second FFT module coupled to the error evaluation module, a second DFT of the input signal, which is fed to the LMS module.

Figure 3A:
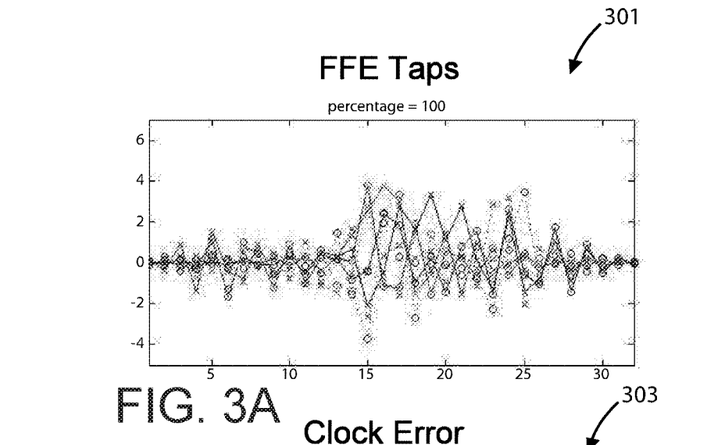
FIG. 3A-3D are simplified graphs illustrating simulations for a coherent optical receiver according to conventional example.
Figure 3B:
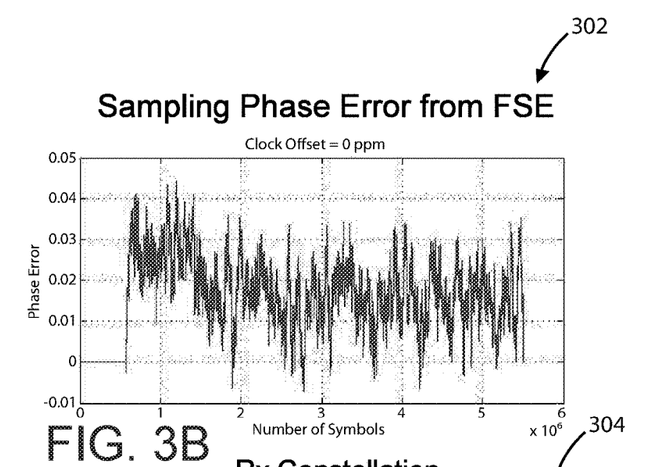
Figure 3C:
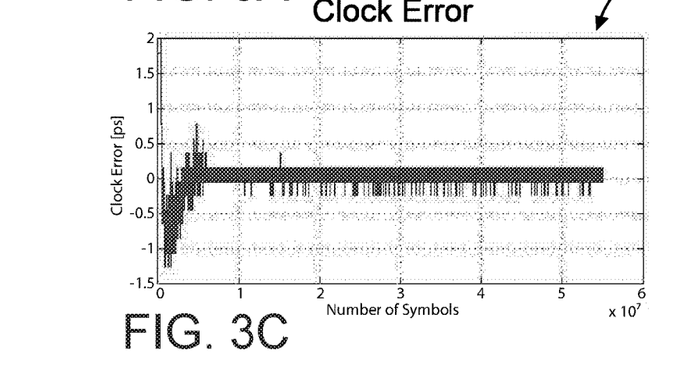
Figure 3D:
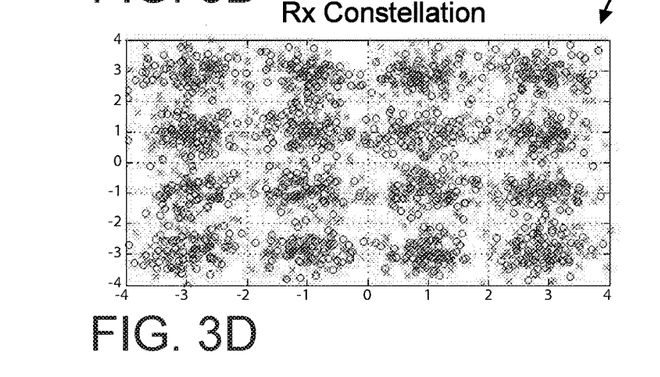

FIG. 3A-3D are simplified graphs illustrating simulations for a coherent optical receiver according to conventional example. As shown, graphs 301-304 illustrate a first test case applying the constrained adaptive algorithm or tap stabilizer algorithm. Here, the LMS step-size is $2^{-11}$ and the clock offset is 0 ppm. FIG. 3A (graph 301) shows the signals at the FFE taps (i.e., PMD equalizer taps). FIG. 3B (graph 302)

shows the sampling phase error computed from the PMD equalizer taps. FIG. 3C (graph 303) shows the clock error and FIG. 3D (304) shows an Rx constellation.

Figure 4A:
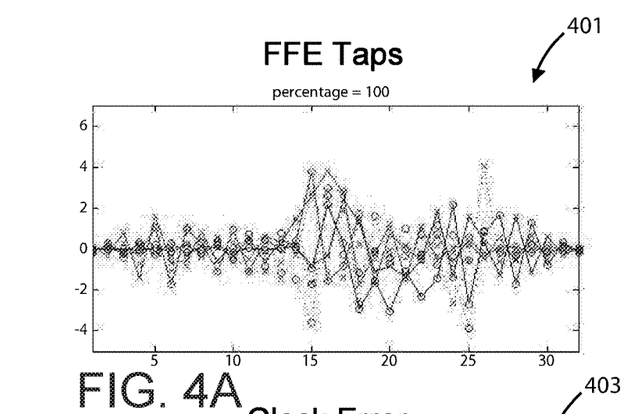
FIG. 4A-4D are simplified graphs illustrating simulations for a coherent optical receive according to an example of the present invention.
Figure 4B:
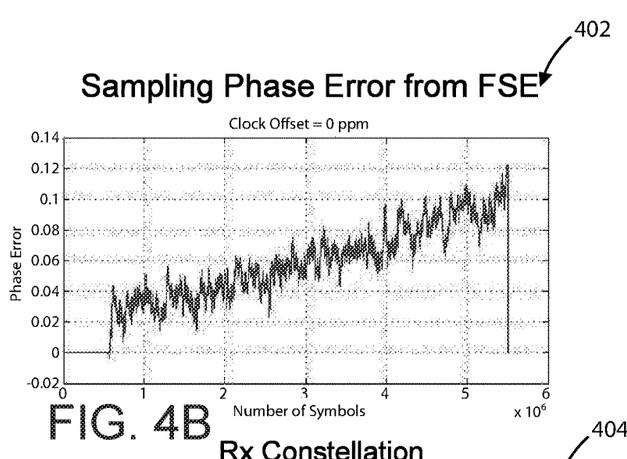
Figure 4C:
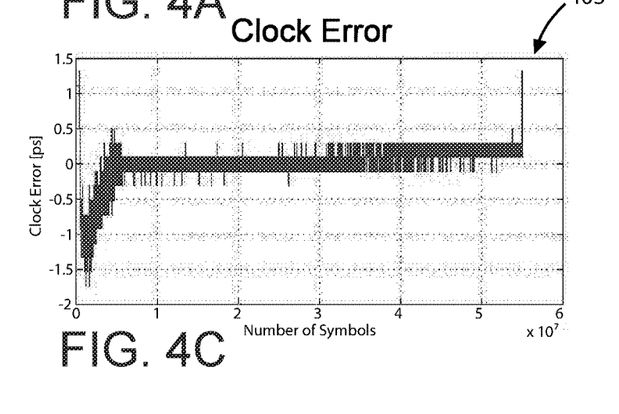
Figure 4D:
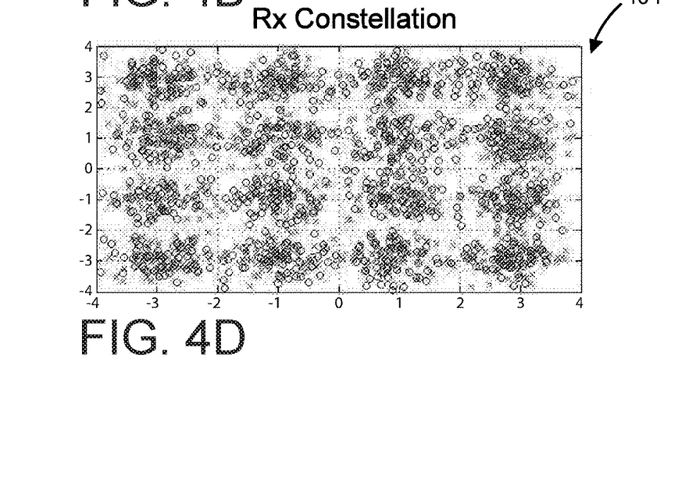

FIG. 4A-4D are simplified graphs illustrating simulations for a coherent optical receive according to an example of the present invention. As shown, graphs 401-404 illustrate a second test case with an unconstrained adaptive algorithm (i.e., without the tap stabilizer algorithm). The LMS step-size and clock offset are the same as for FIGS. 3A-3D (i.e., $2^{-11}$ and 0 ppm, respectively). Similarly, FIG. 4A (graph 401) shows the signals at the FFE taps equalizer taps. FIG. 4B (graph 402) shows the sampling phase error computed from the PMD equalizer taps. FIG. 4C (graph 403) shows the clock error and FIG. 4D (404) shows an Rx constellation. Compared to the case of FIGS. 3A-3D, this case does not estimate the sampling phase error as accurately.

Figures 5A, 5C:
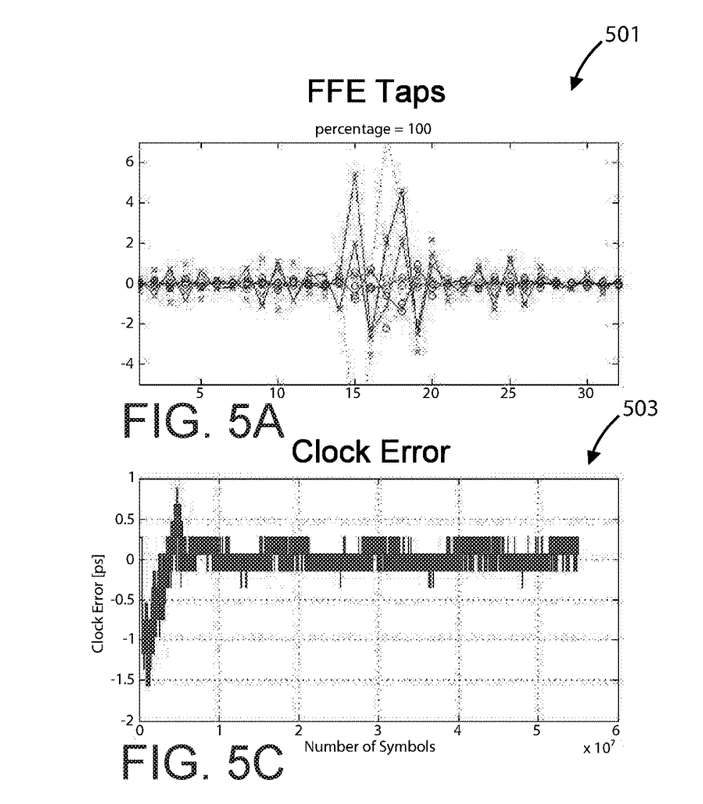
FIG. 5A-5D are simplified graphs illustrating simulations for a coherent optical receiver according to conventional example.
Figures 5B, 5D:
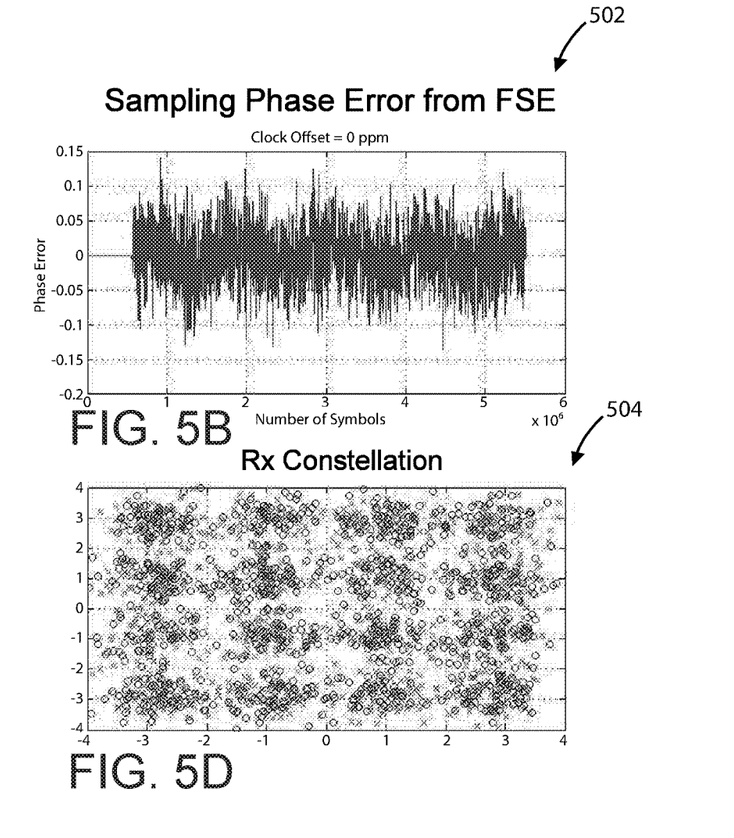

FIG. 5A-5D are simplified graphs illustrating simulations for a coherent optical receiver according to conventional example. As shown, graphs 501-504 illustrate a third test case applying the tap stabilizer algorithm with a time variant differential-group-delay (DGD). Here, the LMS step-size is $2^{-8}$ and the channel is characterized by DGD=T/2→Rot. KHz→DGD=T/2. FIG. 5A (graph 501) shows the signals at the FFE taps (i.e., PMD equalizer taps). FIG. 5B (graph 502) shows the sampling phase error computed from the PMD equalizer taps. FIG. 5C (graph 503) shows the clock error and FIG. 5D (504) shows an Rx constellation.

Figure 6A:
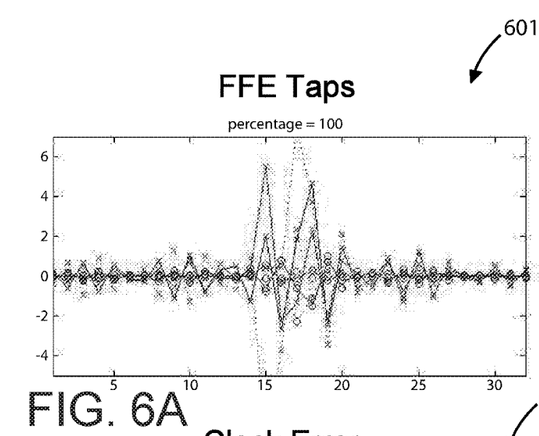
FIG. 6A-6D are simplified graphs illustrating simulations for a coherent optical receive according to an example of the present invention.
Figure 6B:
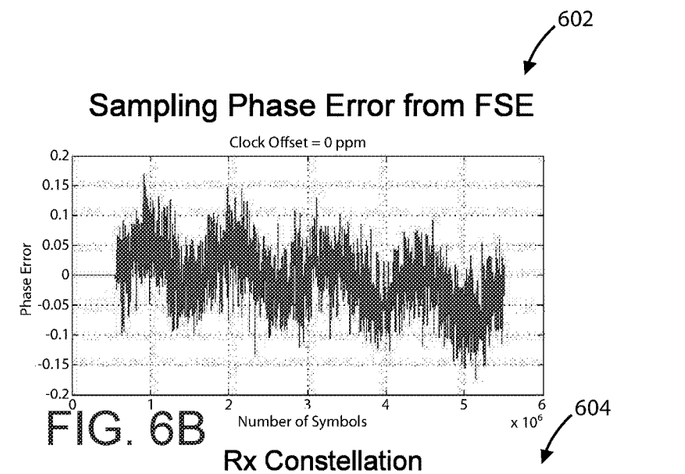
Figure 6C:
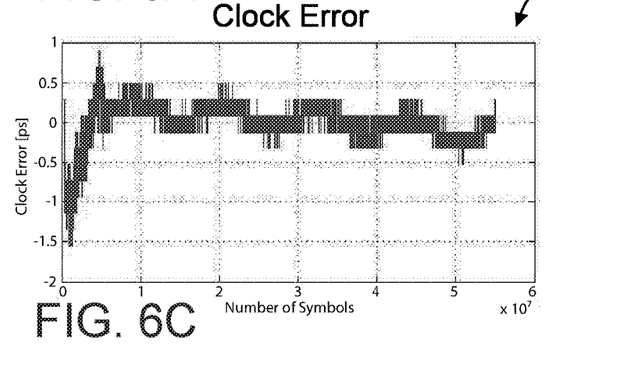
Figure 6D:
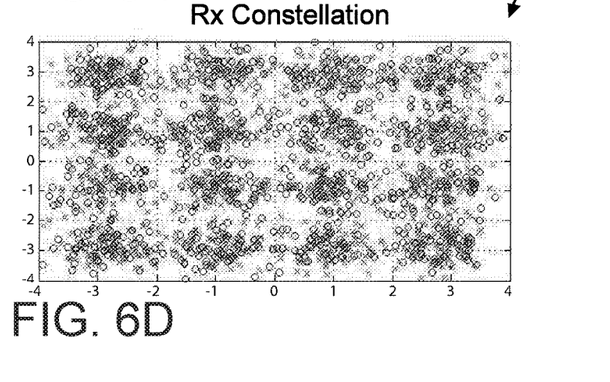

FIG. 6A-6D are simplified graphs illustrating simulations for a coherent optical receive according to an example of the present invention. As shown, graphs 601-604 illustrate a fourth test case with without the tap stabilizer algorithm with a time variant DGD. The LMS step-size and channel characterization are the same as for FIGS. 5A-5D (i.e., $2^{-8}$ and DGD=T/2→Rot. KHz→DGD=T/2, respectively). Similarly, FIG. 6A (graph 401) shows the signals at the FFE taps equalizer taps. FIG. 6B (graph 602) shows the sampling phase error computed from the PMD equalizer taps. FIG. 6C (graph 603) shows the clock error and FIG. 6D (604) shows an Rx constellation. Compared to the case of FIGS. 5A-5D, this case does not estimate the sampling phase error as accurately.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A coherent optical receiver device, the device comprising:
   an input signal;
   a first fast Fourier transform (FFT) module receiving the input signal, the first FFT module being configured to compute a first discrete Fourier transform (DFT) of the input signal;
   a chromatic dispersion (CD) equalizer module coupled to the first FFT module, the CD equalizer module being configured to compensate for CD affecting the input signal;
   a polarization mode dispersion (PMD) equalizer module coupled to the CD equalizer and a least means square (LMS) module, the PMD equalizer module having a plurality of PMD taps and being configured to compensate for PMD affecting the input signal following compensation by the CD equalizer module;
   an inverse FFT (IFFT) module coupled to the PMD equalizer module, the IFFT module being configured to compute an inverse DFT of the input signal;
   an interpolated timing recovery (ITR) module coupled to the IFFT module,
   an error evaluation module coupled to the IFFT module, the error evaluation module being configured to compute a first sampling phase error (SPE);
   a timing phase information (TPI) module coupled to the error evaluation module and the IFFT module, the TPI module being configured to compute a second SPE from the plurality PMD taps;
   a combining module coupled to the TPI module and the error evaluation module, the combining module being configured to combine the first and second SPE into a total phase error (TPE);
   a timing recovery (TR) filter coupled to the ITR module and the combining module, the TR filter being configured to filter the TPE;
   wherein the ITR module is configured to synchronize the input signal using the TPE; and
   a second FFT module coupled to the error evaluation module, the second FFT module being configured to compute a second DFT of the input signal;
   wherein the LMS module is coupled to the second FFT module, the CD equalizer module, and the PMD equalizer module, the LMS module being configured to filter the input signal.

2. The device of claim 1 wherein the input signal is a dual-polarization input with an x-type polarization input and a y-type polarization input.

3. The device of claim 1 wherein the CD equalizer module includes a non-adaptive frequency-domain (FD) equalizer, and wherein the PMD equalizer module includes an adaptive FD equalizer.

4. The device of claim 1 wherein the first SPE is computed according to a baud rate synchronization technique based on a Muller and Mueller phase error.

5. The device of claim 1 wherein the first SPE is computed according to the following equation:

$$\varepsilon_{mm} = K_{mm} \Re \left( \sum_{nN_p+2}^{(n+1)N_p} \hat{a}^*(k)q(k-1) - \hat{a}^*(k-1)q(k) \right)$$

where $K_{mm}$ is a certain gain,
where $\Re$ refers to real component of a complex number,
where $N_p$ is a parallelism factor,
where $q(k)$ is an input of slicer and error evaluation module, and
where $\hat{a}^*$ is an output of the slicer and error evaluation module.

6. The device of claim 1 wherein the second SPE is computed from the plurality of PMD taps according to the following equation:

$\varepsilon_{fse} = -K_{fse}\text{angle}(det(M_f))$ where $K_{fse} = [2^{-1}, \ldots, 2^{-4}]$, and
where $M_f = e^{-j2\omega_0\tau}|P(\omega_0)|^2 Z(\omega_0, -\omega_0, t)$,
where $\omega_0$ is a given frequency,
where $$\tau = \frac{\Delta T}{(T + \Delta T)t} < 200 \times 10^{-6} t,$$

where $P(\omega_0)$ is a CD parameter, and
where $Z(\omega_0, -\omega_0, t)$ is a unitary matrix for all $(\omega_0, t)$.

7. The device of claim 1 wherein the second SPE is computed from the plurality of PMD taps according to the following equation:

$$\varepsilon_{fse} = 2\omega_0 \tau$$

where $\omega_0$ is a given frequency, and
where $$\tau = \frac{\Delta T}{(T + \Delta T)t} < 200 \times 10^{-6} t,$$

where t is a given time, and
where T is a symbol period.

8. The device of claim 1 wherein the error evaluation module includes a slicer module configured to derive a data stream from the input signal.

9. The device of claim 1 further comprising a zero padding module coupled to between the error evaluation module and the second FFT module, the zero padding module being configured to increase a sampling rate of the input signal.

10. A method of operating a coherent optical receiver device, the method comprising:
providing an input signal;
computing, by a first fast Fourier transform (FFT) module receiving the input signal, a first discrete Fourier transform (DFT) of the input signal;
compensating, by a chromatic dispersion (CD) equalizer module coupled to the first FFT module, for CD affecting the input signal;
compensating, by a polarization mode dispersion (PMD) equalizer module coupled to the CD equalizer module and coupled to a least means square (LMS) module and having a plurality of PMD taps, for PMD affecting the input signal following the compensation by the CD equalizer module;
computing, by an inverse FFT (IFFT) module coupled to the PMD equalizer module, an inverse DFT of the input signal;
computing, by an error evaluation module coupled to the IFFT module, a first sampling phase error (SPE);
computing, by a timing phase information (TPI) module coupled to the error evaluation module and the IFFT module, a second SPE from the plurality of PMD taps;
combining, by a combining module coupled to the TPI module and the error evaluation module, the first and second SPE into a total phase error (TPE);
filtering, by a timing recovery (TR) filter coupled to an interpolated timing recovery (ITR) module and the combining module, the TPE;
synchronizing, by the ITR module, the input signal according to the TPE;
computing, by a second FFT module coupled to the error evaluation module, a second DFT of the input signal; and
filtering, by the LMS module coupled to the CD equalizer module and the second FFT module and the PMD equalizer module, the input signal.

11. The method of claim 10 wherein the input signal is a dual-polarization input with an x-type polarization input and a y-type polarization input.

12. The method of claim 10 wherein compensating by the CD equalizer module includes compensating by a non-adaptive frequency-domain (FD) equalizer, and wherein compensating by the PMD equalizer module includes compensating by an adaptive FD equalizer.

13. The method of claim 10 wherein the first SPE is computed according to a baud rate synchronization technique based on a Muller and Mueller phase error.

14. The method of claim 10 wherein the first SPE is computed according to the following equation:

$$\varepsilon_{mm} = K_{mm} \Re \left( \sum_{nN_p+2}^{(n+1)N_p} \hat{a}^*(k)q(k-1) - \hat{a}^*(k-1)q(k) \right)$$

where $K_{mm}$ is a certain gain,
where $\Re$ refers to real component of a complex number,
where $N_p$ is a parallelism factor,
where $q(k)$ is an input of slicer and error evaluation module, and
where $\hat{a}^*$ is an output of the slicer and error evaluation module.

15. The device of claim 10 wherein the second SPE is computed from the plurality of PMD taps according to the following equation:

$$\varepsilon_{fse} = -K_{fse} \text{angle}(det(M_f))$$

where $K_{fse} = [2^{-1}, \ldots, 2^{-4}]$, and
where $M_f = e^{-j2\omega_0\tau} |P(\omega_0)|^2 Z(\omega_0, -\omega_0, t)$,
where $\omega_0$ is a given frequency,
where $$\tau = \frac{\Delta T}{(T + \Delta T)t} < 200 \times 10^{-6} t,$$

where $P(\omega_0)$ is a CD parameter, and
where $Z(\omega_0, -\omega_0, t)$ is a unitary matrix for all $(\omega_0, t)$.

16. The device of claim 10 wherein the second SPE is computed from the plurality of PMD taps according to the following equation:

$$\varepsilon_{fse} = 2\omega_0 \tau$$

where $\omega_0$ is a given frequency, and
where $$\tau = \frac{\Delta T}{(T + \Delta T)t} < 200 \times 10^{-6} t,$$

where t is a given time, and
where T is a symbol period.

17. The method of claim 10 further comprising deriving, by a slicer module configured with the error evaluation module, a data stream from the input signal.

18. The method of claim 10 further comprising increasing, by a zero padding module coupled between the error evaluation module and the second FFT, a sampling rate of the input signal.

19. An error compensation device configured within a coherent optical receiver, the device comprising:
an input signal;
a chromatic dispersion (CD) equalizer module being configured to compensate for CD affecting the input signal;
a polarization mode dispersion (PMD) equalizer module coupled to the CD equalizer and a least means square (LMS) module, the PMD equalizer module having a plurality of PMD taps and being configured to compensate for PMD affecting the input signal following compensation by the CD equalizer module;
an error evaluation module coupled to the PMD equalizer module, the error evaluation module being configured to compute a first sampling phase error (SPE);
a timing phase information (TPI) module coupled to the error evaluation module and the PMD equalizer module, the TPI module being configured to compute a second SPE from the plurality PMD taps;
a combining module coupled to the TPI module and the error evaluation module, the combining module being configured to combine the first and second SPE into a total phase error (TPE);
a timing recovery (TR) filter coupled to the combining module, the TR filter being configured to filter the TPE; and
an interpolated timing recovery (ITR) module coupled to the combining module and the PMD equalizer module, the ITR module being configured to synchronize the input signal using the TPE;
wherein the LMS module is coupled to the error evaluation module, the CD equalizer module, and the PMD equalizer module, the LMS module being configured to filter the input signal.

20. The device of claim 19 wherein the input signal is a dual-polarization input with an x-type polarization input and a y-type polarization input.

21. The device of claim 19 wherein the CD equalizer module includes a non-adaptive frequency-domain (FD) equalizer, and wherein the PMD equalizer module includes an adaptive FD equalizer.

22. The device of claim 19 wherein the first SPE is computed according to a baud rate synchronization technique based on a Muller and Mueller phase error.

23. The device of claim 19 wherein the first SPE is computed according to the following equation:

$$\varepsilon_{mm} = K_{mm} \Re \left( \sum_{nN_p+2}^{(n+1)N_p} \hat{a}^*(k)q(k-1) - \hat{a}^*(k-1)q(k) \right)$$

where $K_{mm}$ is a certain gain,
where $\Re$ refers to real component of a complex number,
where $N_p$ is a parallelism factor,
where $q(k)$ is an input of slicer and error evaluation module, and
where $\hat{a}^*$ is an output of the slicer and error evaluation module.

24. The device of claim 19 wherein the second SPE is computed from the plurality of PMD taps according to the following equation:

$$\varepsilon_{fse} = -K_{fse} \text{angle}(det(M_f))$$

where $K_{fse} = [2^{-1}, \ldots, 2^{-4}]$, and
where $M_f = e^{-j2\omega_0 \tau}|P(\omega_0)|^2 Z(\omega_0, -\omega_0, t)$,
where $\omega_0$ is a given frequency,
where $$\tau = \frac{\Delta T}{(T + \Delta T)t} < 200 \times 10^{-6} t,$$

where $P(\omega_0)$ is a CD parameter, and
where $Z(\omega_0, -\omega_0, t)$ is a unitary matrix for all $(\omega_0, t)$.

25. The device of claim 19 wherein the second SPE is computed from the plurality of PMD taps according to the following equation:

$$\varepsilon_{fse} = 2\omega_0 \tau$$

where $\omega_0$ is a given frequency, and
where $$\tau = \frac{\Delta T}{(T + \Delta T)t} < 200 \times 10^{-6} t,$$

where t is a given time, and
where T is a symbol period.

26. A method of error compensation for a coherent optical receiver device, the method comprising:
providing an input signal;
compensating, by a chromatic dispersion (CD), for CD affecting the input signal;
compensating, by a polarization mode dispersion (PMD) equalizer module coupled to the CD equalizer module and coupled to a least means square (LMS) module and having a plurality of PMD taps, for PMD affecting the input signal following the compensation by the CD equalizer module;
computing, by an error evaluation module coupled to the PMD equalizer module, a first sampling phase error (SPE);
computing, by a timing phase information (TPI) module coupled to the error evaluation module, a second SPE from the plurality of PMD taps;
combining, by a combining module coupled to the TPI module and the error evaluation module, the first and second SPE into a total phase error (TPE);
filtering, by a timing recovery (TR) filter coupled to an interpolated timing recovery (ITR) module and the combining module, the TPE;
synchronizing, by an ITR module coupled to the PMD equalizer module, the input signal according to the TPE; and
filtering, by the LMS module, the input signal.

27. The method of claim 26 wherein the input signal is a dual-polarization input with an x-type polarization input and a y-type polarization input.

28. The method of claim 26 wherein the first SPE is computed according to a baud rate synchronization technique based on a Muller and Mueller phase error.

29. The method of claim 26 wherein the first SPE is computed according to the following equation:

$$\varepsilon_{mm} = K_{mm} \Re \left( \sum_{nN_p+2}^{(n+1)N_p} \hat{a}^*(k)q(k-1) - \hat{a}^*(k-1)q(k) \right)$$

where $K_{mm}$ is a certain gain
where $\Re$ refers to real component of a complex number
where $N_p$ is a parallelism factor,
where $q(k)$ is an input of slicer and error evaluation module, and
where $\hat{a}^*$ is an output of the slicer and error evaluation module.

30. The device of claim 26 wherein the second SPE is computed from the plurality of PMD taps according to the following equation:

$$\varepsilon_{fse} = -K_{fse} \text{angle}(det(M_f))$$

where $K_{fse}=[2^{-1}, \ldots, 2^{-4}]$, and
where $M_f = e^{-j2\omega_0\tau}|P(\omega_0)|^2 Z(\omega_0, -\omega_0, t)$,
where $\omega_0$ is a given frequency,
where $$\tau = \frac{\Delta T}{(T+\Delta T)t} < 200 \times 10^{-6} t,$$

where $P(\omega_0)$ is a CD parameter, and
where $Z(\omega_0, -\omega_0, t)$ is a unitary matrix for all $(\omega_0, t)$.

31. The device of claim 26 wherein the second SPE is computed from the plurality of PMD taps according to the following equation:

$$\varepsilon_{fse} = 2\omega_0 \tau$$

where $\omega_0$ is a given frequency, and
where $$\tau = \frac{\Delta T}{(T+\Delta T)t} < 200 \times 10^{-6} t,$$

where t is a given time, and
where T is a symbol period.

* * * * *